United States Patent [19]

Buckthorpe

[11] 3,981,697

[45] Sept. 21, 1976

[54] CARRIER AND CLAMP ASSEMBLY FOR A VEHICLE WINDOW

[75] Inventor: George E. Buckthorpe, Southfield, Mich.

[73] Assignee: General Motors Corporation, Detroit, Mich.

[22] Filed: Sept. 22, 1975

[21] Appl. No.: 615,764

[52] U.S. Cl. .................................. 52/400; 52/212; 52/208; 52/403; 296/93
[51] Int. Cl.² ...................... E04B 1/62; E04F 15/14
[58] Field of Search ............ 52/400, 468, 403, 379, 52/717, 718, 312, 212, 208; 403/105; 296/93

[56] References Cited
UNITED STATES PATENTS

| | | | |
|---|---|---|---|
| 2,860,744 | 11/1958 | Mascari | 52/212 |
| 3,420,003 | 1/1969 | Cline | 52/212 |
| 3,750,358 | 8/1973 | Lewkowitz | 52/400 |

FOREIGN PATENTS OR APPLICATIONS

| | | | |
|---|---|---|---|
| 1,801,175 | 4/1970 | Germany | 52/208 |

*Primary Examiner*—Ernest R. Purser
*Assistant Examiner*—Robert Farber
*Attorney, Agent, or Firm*—Arthur N. Krein

[57] ABSTRACT

A carrier and clamp assembly for a vehicle window assembly having a window frame support structure within which a window panel is retained by the carrier and clamp assembly that includes a carrier having a retainer stud extending from one side thereof for insertion into an aperture in the support structure, the opposite side of the carrier being provided with a plurality of parallel serrations, the carrier being of a size to serve as a support surface for an edge of the window panel. A clamp is slidably received and guided on the carrier by a tongue and groove arrangement on these elements, the clamp being provided with parallel serrations positioned to interlock with the serrations on the carrier in such a manner so that the clamp can be moved across the carrier in one direction only, that is, in a direction toward the window panel to serve as a retainer for the window panel when positioned in abutment against the window panel. Alternately, the clamp can be provided with integral, flexible cantilever extensions with the free ends of these extensions terminating in lips adapted to receive the return bent flanges of a garnish molding.

5 Claims, 4 Drawing Figures

U.S. Patent    Sept. 21, 1976    3,981,697
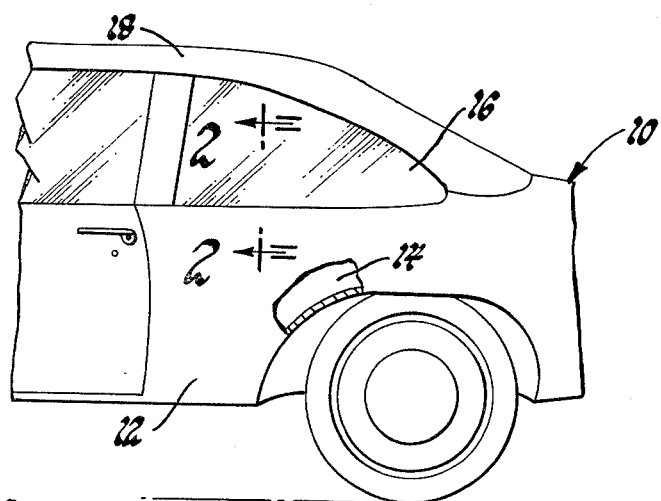
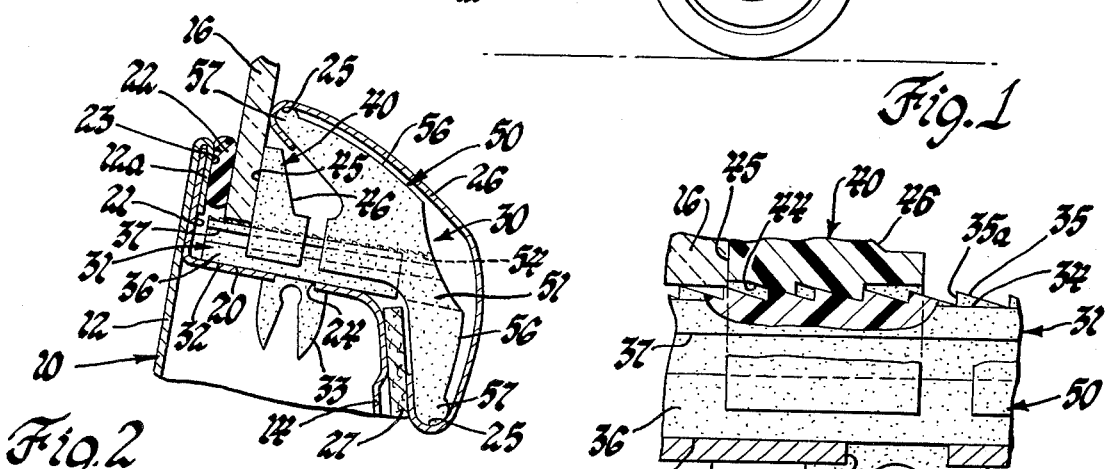
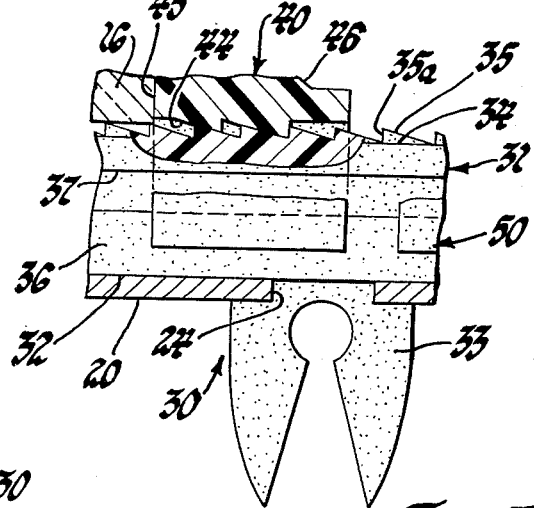
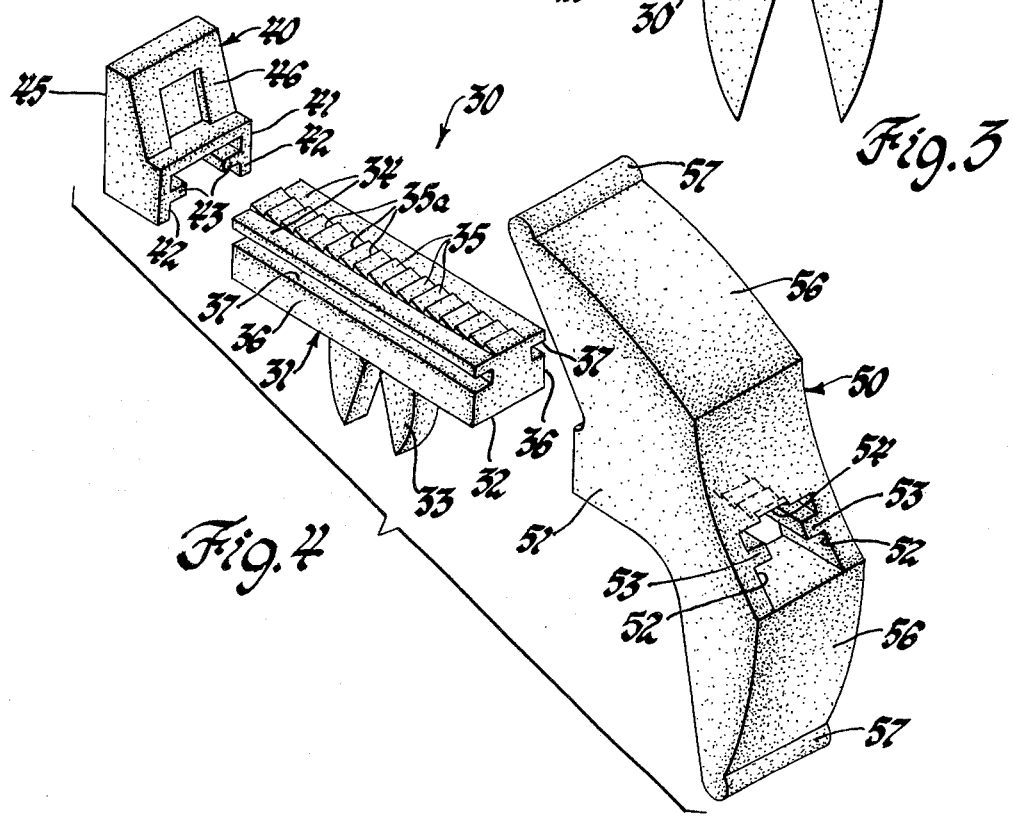

CARRIER AND CLAMP ASSEMBLY FOR A VEHICLE WINDOW

This invention relates to a window assembly and, in particular, to a carrier and clamp assembly for use in such a window assembly.

Window assemblies for motor vehicles have heretofore been provided wherein a glass panel is maintained within a window receiving opening in the window frame of a vehicle body by suitable retaining and sealing means. In addition, an ornamental molding is normally positioned around the outer edge of the glass panel to conceal the edges of the glass and the retaining and seal means, this molding, when used in the interior of the vehicle, being referred to as a garnish molding.

In practice, various retaining means, such as, for example, resilient retaining strips, have been used to retain the glass panel in place. It has also been the general practice to install the molding by suitable clips which lodge on and are located as, for example, by heated studs welded to the window frame. Various problems relative to such window assemblies have been encountered as, for example, inaccuracies in welding the studs to the window frame have adversely affected the alignment of the clips and, thus, their conformity to the desired plane of the molding secured thereto.

Accordingly, the primary object of this invention is to provide a new and improved window assembly and, in particular, a carrier and clamp assembly for such a window assembly, the carrier portion of which is adapted to snap into attachment with the support structure for the glass panel to serve as a support for one edge of the glass panel, the clamp being slidable on the carrier for movement into a locked position relative thereto to serve as a retainer for the glass panel by abutment of the clamp against the glass panel. In addition, the clamp can serve as a molding retainer clamp for a garnish molding.

Another object of this invention is to provide a carrier and clamp assembly for use in the installation of a window panel in an automotive vehicle.

A further object of this invention is to provide a carrier and window retainer clamp assembly for use in retaining a window in a vehicle body.

A still further object of this invention is to provide an improved molding retainer assembly for use in a vehicle body.

These and other objects of the invention are obtained by a carrier and clamp assembly for, as an example, the fixed quarter window of a vehicle body, the carrier being adapted to be secured to a portion of the quarter window frame to extend at substantially right angle to a window panel inserted in the frame opening whereby a clamp member can then be slidably secured to the carrier for movement in one direction only thereon, to serve as the window retainer. Alternately, the clamp can also serve as a molding retainer, or both.

For a better understanding of the invention, as well as other objects and further features thereof, reference is had to the following detailed description of the invention to be read in connection with the accompanying drawings, wherein:

FIG. 1 is a fragmentary side elevational view of an automobile vehicle body having a window assembly with a carrier and clamp assembly of the invention as part thereof;

FIG. 2 is an enlarged, sectional view taken along line 2—2 of FIG. 1 showing the window assembly with a carrier and clamp assembly in accordance with the invention, one clamp of the assembly shown being used to effect retention of a window panel and the other clamp being used as a retainer for a garnish molding;

FIG. 3 is an enlarged, sectional view of a portion of FIG. 2 showing the interlocking relationship of the serrations of the carrier and a clamp; and, FIG. 4 is an enlarged, exploded, perspective view of the carrier and clamp assembly of FIG. 2 showing both a window retainer clamp and a molding retainer clamp carried by a single carrier.

With reference first to FIGS. 1 and 2, the reference character 10 designates an automobile vehicle body having a rear quarter portion including an outer panel 12 and a spaced inner panel 14 suitably secured together at their upper edges to provide a window support structure providing at least part of a window opening or frame of an L-shaped or angle iron configuration for a rear quarter window panel 16 positioned between the upper edge or belt line of the rear quarter portion and the lower edge of the roof 18.

As best seen in FIG. 2, this support structure is defined by the inner panel 14 which has a first or base wall portion 20 bent at a suitable angle to the major portion of the inner panel 14 to define the surface of the window receiving opening, this base wall portion 20 being of sufficient width to receive the window 16 and the carrier and clamp assembly of the invention, generally designated 30, forming part of the window assembly. The inner panel 14 also includes at its upper terminal end a second or side wall portion 21 bent at substantially right angle to the base wall portion 20, this side wall portion projecting inward of the window receiving opening to serve, in effect, as a stop or seat for the window panel 16, this side wall portion 21 being secured to a return bent end flange portion 12a of the outer panel 12 to define therewith a window opening for the window panel 16. A seal 22 is sandwiched between a face of the window panel 16 and the surface 23 provided by the secured side wall portion 21 and end flange portion 12a. The base wall portion 20 of the window support structure is provided at suitably spaced intervals with a plurality of apertures 24 therethrough, each aperture to receive the retainer stud of a carrier, to be described, of the carrier and clamp assembly 30.

Referring now to the carrier and clamp assembly 30 of the invention, this assembly includes a carrier 31 and at least one clamp slidably secured thereon. In the preferred embodiment disclosed, as seen in FIG. 2, a pair of clamps are slidably mounted on the carrier, one of the clamps being a window retaining clamp, designated 40, and the other being a molding retainer clamp, designated 50, adapted to receive the return bent flanges 25 of a garnish molding 26 so as to provide a decorative molding enclosing the window retaining elements and window frame on one side thereof within the interior of the vehicle body.

The carrier 31, made preferably of a suitable plastic material, is of substantially rectangular configuration having a substantially flat base or bottom wall 32 with a retainer stud 33 extending therefrom intermediate its ends for insertion into an aperture 24 in the base wall 20 of the window support structure. The top surface of the carrier 31 includes, in the embodiment illustrated, longitudinal extending planar surfaces 34 on opposite sides of a central portion having transverse, parallel serrations thereon forming cam surfaces 35 inclined at an angle relative to the base and abutment surfaces 35a between adjacent cam surfaces 35 which are substantially at right angle to the bottom wall 32, as best seen in FIGS. 3 and 4. Each of the longitudinal sides 36 of the carrier 31 is provided with a groove 37 therein extending the length of each side.

As best seen in FIG. 2, the carrier 31 is assembled to the base wall portion 20 so that the abutment surfaces 35a between adjacent cam surfaces 35 face towards the window opening, for a purpose which will become apparent. In addition, the length of the carrier 31 is sized relative to the bottom wall 32 with the retainer stud 33 formed, in a position thereon, so that when the carrier is secured to the base wall 20 with the retainer stud 33 extending through an aperture 24 therein, one end of the carrier will be positioned closely adjacent to the surface 23 whereby an edge of the window panel 16 can be supported in the upper surface of the carrier, with the opposite end of the carrier then terminating closely adjacent to the interconnection of the base wall 20 and the major portion of inner panel 14.

The retaining clamp 40, which is also preferably made of a suitable plastic material and is adapted to be slidably positioned on the carrier 31, includes a body portion 41 having a longitudinal slot channel therethrough, the slot channel defining spaced apart, internal side walls 42 with intermediate, inwardly extending flanges 43 of a configuration complementary to the grooves in the carrier 31 whereby the clamp is slidably interlocked with the carrier. The overall height of a side wall 42 and its intermediate flange 32 is less than the height of the carrier 31. In addition, the side walls 42 are interconnected by a lower wall which abuts against the top surface of the carrier 31, this lower wall being formed complementary to the top surface of carrier 31 and includes parallel, transverse ratchet teeth 44 thereon formed complementary to the ratchet teeth on the carrier 31, as best seen in FIG. 3, whereby the clamp 40 is movable in only one direction, to the left with reference to FIGS. 2 and 3, relative to the carrier and is locked to the carrier by said ratchet teeth against movement in the opposite direction, that is, against movement to the right with reference to FIGS. 2 and 3.

The body of the clamp 40 is also provided with an enlarged portion at one end or outboard end thereof, the lefthand end with reference to FIGS. 2 and 4, to provide a lateral end surface 45 that extends upward relative to the carrier 31, when the clamp 40 is assembled thereto, whereby the clamp 40 is operable as a glass retainer or fastener to effect retention of the glass panel when the clamp 40 is moved so that the end surface 45 abuts against the glass panel as seen in FIG. 2. Thus, in the position as shown in FIG. 2, the clamp, which has been moved relative to the carrier to have the end surface 45 in abutment against the glass panel, will retain the window panel 16 against the surface 23 with the seal 22 sandwiched therebetween, since the ratchet teeth on this clamp and the carrier, respectively, will prevent any movement of the clamp 40 relative to the carrier in a direction away from the window panel, that is, to the right with reference to FIG. 2. This enlarged portion of the body of clamp 40 also provides on its inboard side an extension surface 46, also projecting upward from the carrier 31 when clamp 40 is carried thereby, to facilitate movement of the clamp by an assembler during installation of this element to effect retention of the window panel 16.

The molding retainer clamp 50 is similar in construction to the clamp 40 relative to its means for attachment to the carrier 31 and, as such, includes a body portion 51 having a longitudinal channel therethrough providing the spaced apart internal side walls 52 with intermediate, inwardly extending flanges 53 of a configuration complementary to the grooves in the carrier 31 whereby this clamp is also slidably interlocked with the carrier 31. The side walls 52 are interconnected by a lower wall having the parallel ratchet teeth 54 formed thereon for cooperation with the ratchet teeth of the carrier. The clamp 50 further includes flexible cantilever extensions 56 integral with the body portion and facing outwardly from the top and bottom of the body portion, the free ends of the cantilever extensions terminating in lips 57 adapted to receive the return bent flanges 25 of the garnish molding 26.

As is conventional, the garnish molding 26 is of generally channel cross section with the return bent flanges 25 on opposite sides thereof and is dimensioned to overlie the seal 22 and to have its upper margin, the top margin with reference to FIG. 2, bear against the window panel 16 and its lower margin bear against the trim panel 27 suitably secured to the inner panel 14. The extent between the return bent flanges 25 of the garnish molding 26 corresponds to the normal extent between the lips 57 of the cantilever extensions 56. However, since these cantilever extensions 56 are flexible, the extent between the lips 57 can readily be reduced by flexing of the cantilever extensions to permit insertion of these lips 57 into the return bent flanges 25 of the garnish molding to permit assembly of the garnish molding thereto.

In the construction shown, the longitudinal channel through the body portion 51 also extends through the lower extension 56, as seen in FIGS. 2 and 4, to provide an opening therethrough whereby this clamp can have the free end of the carrier 31 extend therethrough, if necessary, on a particular vehicle window assembly. However, in the assembly shown in FIG. 2, the arrangement is preferably such that the carrier 31 does not extend all the way through the molding retainer clamp 50, that is, the upper extension 56 of the clamp 50 is inclined relative to the channel through the clamp so that the upper return bent flange 25 of the garnish molding 26 carried by this upper extension abuts against window panel 16 while the lower extension 56 is inclined so that the lower return bent flange 25 of the garnish molding 26 abuts against the trim panel 27 when the molding retainer clamp 50 is moved on the carrier 31 in a direction toward the window panel 16 to position the molding retainer clamp 50 thereon in the position shown in FIG. 2.

Although the retainer clamp 40 and the molding retainer clamp 50 are shown as separate elements, with either one or both used on a carrier 31 for a given application, it will also be apparent to those skilled in the art that these two clamps, the retainer clamp 40 and the molding retainer clamp 50, could be fabricated into a single unitary retainer and molding retainer clamp structure without departing from the scope of the invention.

What is claimed is:

1. A carrier and clamp assembly for use in a vehicle body having a support structure providing a first wall portion defining a receiving opening and a second wall portion at right angle to the first wall portion defining a window opening, the first wall portion having at least one aperture therethrough and a glass panel positioned within the receiving opening in abutment against the second wall portion with a seal sandwiched therebetween, said carrier and clamp assembly including a carrier of rectangular configuration and having a top surface with parallel, laterally extending, inclined serrations thereon, a base with a retainer stud extending therefrom for insertion into the aperture in the first wall portion whereby said carrier is secured to said first wall portion at right angle to the second wall portion in position to support an edge of the glass panel on the top surface of said carrier, said carrier further having longitudinal sides, each said side having a groove therein extending the length of said side and, a clamp slidably positioned on said carrier, said clamp including a body portion having a longitudinal channel therethrough and extending from one surface thereof whereby said clamp is slidably received on said carrier, said channel defining spaced apart side walls with inwardly extending flanges of a configuration complementary to said grooves to slidably interlock therewith, said side walls being interconnected by a wall having parallel laterally extending serrations thereon to interlock with said serrations on said carrier whereby said clamp is movable in only one direction relative to said carrier and is locked to said carrier by said serrations against movement in the opposite direction.

2. A carrier and clamp assembly according to claim 1 wherein said clamp has an enlarged portion at one end of said body to provide a lateral end surface that extends upward relative to said carrier whereby said clamp is operable as a glass fastener to effect retention of the glass panel upon movement of said clamp in said one direction on said carrier to effect abutment of said lateral end surface against the glass panel.

3. A carrier and clamp assembly according to claim 1 wherein said clamp further includes integral flexible cantilever extension means facing outwardly in opposite directions relative to said body portion, the free ends of said cantilever extension means terminating in lips adapted to receive the return bent flanges of a garnish molding.

4. A window assembly for an automotive vehicle comprising a support structure providing a first wall portion defining a window receiving opening and a second wall portion at right angle to the first wall portion defining a window opening, the first wall portion having at least one aperture therethrough, a glass panel positioned within said receiving opening in abutment against said second wall portion with a seal sandwiched therebetween, a carrier, said carrier being of rectangular configuration and having a top surface with parallel laterally extending inclined serrations thereon, a base with a retainer stud extending therefrom, said stud extending into said aperture in said first wall portion to retain said carrier to said first wall portion, said carrier being positioned at substantially right angle to said second wall portion whereby to support an edge of said glass panel on said top surface of said carrier, said carrier further having longitudinal sides with each said side having a groove therein extending the length of each said side and, a clamp means slidably positioned on said carrier, said clamp means including a body portion having a longitudinal channel therethrough and extending from one surface thereof whereby said clamp means is slidably received on said carrier, said channel defining spaced apart side walls, each with an inwardly extending flange of a configuration complementary to said grooves to slidably interlock therewith, said side walls of said clamp means being interconnected by a wall having parallel laterally extending serrations thereon of complementary configuration to said serrations of said carrier whereby said clamp means can interlock with said carrier, said serrations permitting movement of said clamp means on said carrier in one direction only with said interlocked serrations preventing movement of said clamp means on said carrier in an opposite direction, said carrier means including an enlarged portion at one end thereof to provide a lateral end surface that extends upward relative to said carrier for abutment against a surface of said glass panel opposite said seal to effect retention of said glass panel in abutment against said seal.

5. A window assembly according to claim 4 wherein said clamp means further includes integral, flexible, cantilever extension means on the opposite end of said clamp means from said lateral end surface, the free ends of said cantilever extension means terminating in lips and, a molding means having return bent flanges at opposite sides thereof secured to said clamp means by said lips.

* * * * *